(12) United States Patent
Rosu et al.

(10) Patent No.: US 8,752,299 B2
(45) Date of Patent: Jun. 17, 2014

(54) BLADE GUIDE ASSEMBLY FOR POWER OPERATED ROTARY KNIFE

(75) Inventors: Marinel Rosu, Strongsville, OH (US); Matthew P. Haszto, Vermilion, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 282 days.

(21) Appl. No.: 13/408,438

(22) Filed: Feb. 29, 2012

(65) Prior Publication Data

US 2013/0219726 A1    Aug. 29, 2013

(51) Int. Cl.
*B26B 7/00*    (2006.01)

(52) U.S. Cl.
USPC .................. 30/276; 30/301; 30/316

(58) Field of Classification Search
USPC ............ 30/276, 272.1, 301, 316, 347, 2
See application file for complete search history.

(56) References Cited

U.S. PATENT DOCUMENTS

| | | | | |
|---|---|---|---|---|
| 1,220,345 A * | 3/1917 | Koster | ........................... | 384/571 |
| 1,374,988 A * | 4/1921 | Cooper | ........................... | 384/505 |
| 2,827,657 A * | 3/1958 | Bettcher | ........................ | 452/137 |
| 3,150,409 A * | 9/1964 | Wilcox | ............................. | 452/86 |
| 3,262,474 A * | 7/1966 | Enders | ............................ | 408/209 |
| 3,269,010 A * | 8/1966 | Bettcher | ......................... | 30/276 |
| 3,592,519 A * | 7/1971 | Martin | ........................... | 384/503 |
| 4,019,833 A * | 4/1977 | Gale | ............................. | 416/220 R |
| 4,418,591 A * | 12/1983 | Astle | ............................... | 82/113 |
| 4,494,311 A * | 1/1985 | McCullough | ..................... | 30/276 |
| 4,509,261 A * | 4/1985 | Bettcher | ........................... | 30/276 |
| 4,516,323 A * | 5/1985 | Bettcher et al. | .................. | 30/276 |
| 4,575,938 A * | 3/1986 | McCullough | ..................... | 30/276 |
| 4,637,140 A * | 1/1987 | Bettcher | ........................... | 30/276 |
| 4,829,860 A * | 5/1989 | VanderPol | ........................ | 82/113 |
| 4,854,046 A * | 8/1989 | Decker et al. | ................... | 452/149 |
| 5,522,142 A * | 6/1996 | Whited | ............................. | 30/276 |
| 5,529,532 A * | 6/1996 | Desrosiers | ....................... | 451/344 |
| 5,664,332 A * | 9/1997 | Whited et al. | .................... | 30/276 |
| 5,692,307 A * | 12/1997 | Whited et al. | .................... | 30/276 |
| 5,761,817 A * | 6/1998 | Whited et al. | .................... | 30/276 |
| 6,209,439 B1 * | 4/2001 | Repac et al. | ..................... | 83/858 |
| 7,959,419 B2 * | 6/2011 | Borowski et al. | ......... | 417/423.15 |
| 8,074,363 B2 * | 12/2011 | Whited | ............................ | 30/276 |
| 8,448,340 B2 * | 5/2013 | Whited | ............................ | 30/276 |
| 8,505,207 B2 * | 8/2013 | Thien | ............................... | 30/276 |

(Continued)

*Primary Examiner* — Sean Michalski
(74) *Attorney, Agent, or Firm* — Tarolli, Sundheim, Covell & Tummino LLP

(57) ABSTRACT

A blade guide assembly for receiving the head assembly of a power operated rotary knife. The blade guide assembly includes: a blade guide and a cover secured to the blade guide to secure the head assembly within the blade guide. The blade guide includes a top wall, a bottom wall and an outer wall, an arcuate blade-receiving groove spaced radially inwardly from the outer wall, extending axially from the top wall and defining peripherally spaced apart ends, a head member-receiving channel extending radially inwardly from the outer wall and intersecting the arcuate groove, and a notched region intersecting the peripherally spaced apart ends of the arcuate blade-receiving groove. The cover includes a base secured to the top wall of the blade guide and overlying at least a portion of the arcuate blade-receiving groove and an outer extension defining an opening axially aligned with the notched region of the blade guide.

26 Claims, 10 Drawing Sheets

(56) References Cited

U.S. PATENT DOCUMENTS

| | | | |
|---|---|---|---|
| 2003/0131482 A1* | 7/2003 | Long et al. | 30/276 |
| 2006/0137193 A1* | 6/2006 | Whited | 30/276 |
| 2006/0211966 A1* | 9/2006 | Hatton et al. | 602/16 |
| 2006/0275152 A1* | 12/2006 | Borowski et al. | 417/360 |
| 2007/0283573 A1* | 12/2007 | Levsen | 30/276 |
| 2008/0168667 A1* | 7/2008 | Spinato | 30/391 |
| 2012/0030952 A1* | 2/2012 | Levsen | 30/276 |
| 2013/0025134 A1* | 1/2013 | Mascari et al. | 30/165 |
| 2013/0025136 A1* | 1/2013 | Whited et al. | 30/276 |
| 2013/0025137 A1* | 1/2013 | Whited et al. | 30/276 |
| 2013/0025138 A1* | 1/2013 | Whited et al. | 30/276 |
| 2013/0025139 A1* | 1/2013 | Whited et al. | 30/276 |
| 2013/0243358 A1* | 9/2013 | Stork et al. | 384/445 |

* cited by examiner

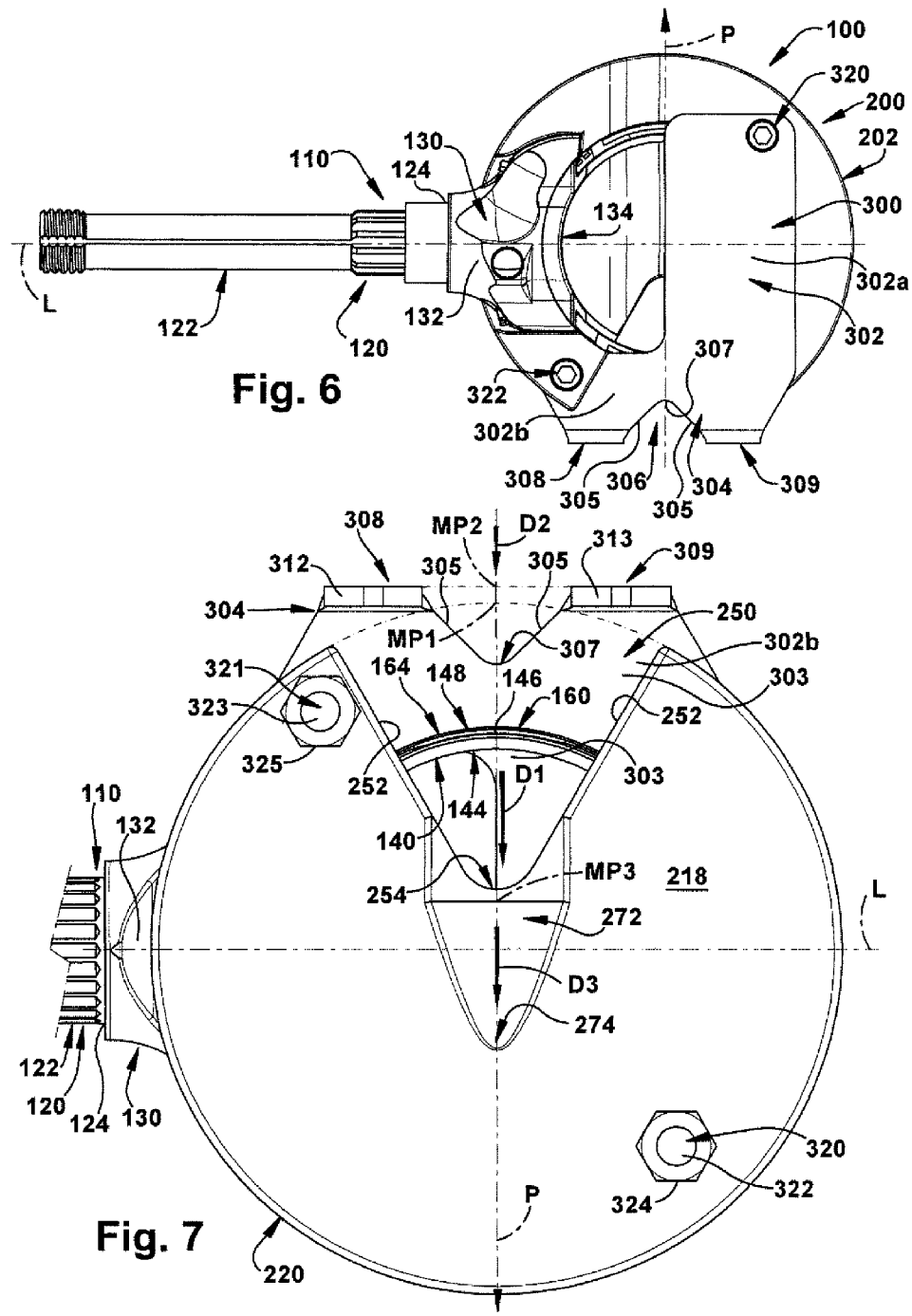

BLADE GUIDE ASSEMBLY FOR POWER OPERATED ROTARY KNIFE

TECHNICAL FIELD

The present disclosure relates to a blade guide assembly for a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy; cutting and trimming of elastomeric or urethane foam for a variety of applications including vehicle seats; and tissue removal or debriding in connection with medical/surgical procedures and/or tissue recovery from a body of a human or animal donor.

Power operated rotary knives typically include a handle assembly, a rotary knife blade, and a blade housing for rotatably supporting the rotary knife blade. The handle assembly includes an elongated frame member, which receives a hand grip, and a head assembly extending from the frame member. The head assembly includes a head member that defines a mounting region for detachably mounting the blade housing and blade to the handle assembly. The head member also defines a cavity to support a gear train for rotatably driving the rotary knife blade. The frame member supports the hand grip which is grasped by an operator and used to manipulate the power operated rotary knife. A power operated rotary knife is disclosed in U.S. Pat. No. 6,662,452 to Whited. The '452 patent is assigned to the assignee of the present application and is incorporated herein, in its entirety, by reference.

Animal intestines, specifically the small intestines of mammals such as cattle, swine, sheep, etc., are highly valued as a source of human nutrition in certain countries. In order to process animal small intestines for human consumption, the small intestine, which is an elongated, cylindrical shaped tissue, must be separated from the mesentery tissue that supports the small intestines within the abdominal cavity of the animal. The mesentery tissue overlies and adheres to the outer surface of the small intestine tissue. In addition to mesentery tissue, fat tissue in the abdominal cavity will often be intertwined with the mesentery tissue and the intestines. Thus, a conglomeration of material removed from the abdominal cavity of an animal will include intertwined small intestine tissue, mesentery tissue and fat tissue. During processing of the conglomeration of material, it is desired to separate both the mesentery tissue and fat tissue from the small intestine tissue. Traditionally, an end of the small intestine is attached to a spinning wheel which pulls the intestine tissue through a processing station. At the processing station, workers using long knives or razors to separate the mesentery tissue and fat tissue from the small intestine. Such manual separation and removal of the mesentery tissue and fat tissue from the intestine is a laborious, time-consuming task. Additionally, the operator must have sufficient skill when using a knife or razor to avoid cutting the intestine. Blades and razors must repeatedly be sharpened or replaced, depending on the nature of the knife or razor used—whether disposable or sharpenable.

Certain manufacturers offer specialized intestine processing machines designed to separate mesentery tissue from animal small intestines. However, these machines typically are expensive, require significant space in the meat processing facility and require ongoing maintenance. Additionally, such specialized machines typically require by-hand manipulation of the small intestines as they are being fed into the machine.

Potentially, a power operated rotary knife, wherein the rotary knife blade rotates at 1000 RPM or more, could facilitate separation and/or removal of mesentery tissue and fat tissue from intestine tissue and thereby make the processing of intestines less labor intensive and, at the same time, require less operator skill during processing. Additionally, a power operated rotary knife is compact, requiring little plant or facility space and is relatively inexpensive and easy to maintain, as compared to specialized intestine processing machines.

SUMMARY

In one aspect, the present disclosure relates to a blade guide assembly for guiding material to interest a rotary knife blade of a power operated rotary knife. The blade guide assembly comprises a blade guide and a cover secured to the blade guide. The blade guide includes a top wall, a bottom wall spaced axially from the top wall and an outer wall, an arcuate blade-receiving groove spaced radially inwardly from the outer wall, extending axially from the top wall and defining peripherally spaced apart ends, a head member-receiving channel extending radially inwardly from the outer wall and intersecting the arcuate blade-receiving groove, and a notched region intersecting the peripherally spaced apart ends of the arcuate blade-receiving groove and extending from the top wall through the bottom wall, the notched region defining an opening extending radially inwardly from the outer wall. The cover includes a base secured to the top wall of the blade guide and overlying at least a portion of the arcuate blade-receiving groove.

In another aspect, the present disclosure relates to a combination comprising a power operated rotary knife and a blade guide assembly for guiding material to intersect a rotary knife blade of the power operated rotary knife. The combination comprises the power operated rotary knife and the blade guide assembly. The power operated rotary knife comprises a handle assembly including an elongated frame member and a head member extending from an end of the elongated frame member, the head member including a mounting region; the rotary knife blade; and a blade housing rotatably supporting the rotary knife blade, a portion of the rotary knife blade extending from the blade housing, the blade housing mounted to the mounting region of the head member. The blade guide assembly comprising a blade guide and a cover. The blade guide includes a top wall, a bottom wall spaced axially from the top wall and an outer wall, an arcuate groove spaced radially inwardly from the outer wall, extending axially from the top wall and defining peripherally spaced apart ends, the arcuate groove receiving the rotary knife blade of the power operated rotary knife, a channel extending radially inwardly from the outer wall and intersecting the arcuate groove, the channel receiving the head member, and a notched region intersecting the peripherally spaced apart ends of the arcuate groove and extending from the top wall through the bottom wall, the notched region defining an opening extending radially inwardly from the outer wall, a portion of the rotary knife blade traversing the opening defined by the notched region. The cover includes a base secured to the top wall of the blade guide and overlying at least a portion of the arcuate groove to secure the blade housing of the power operated rotary knife within the arcuate groove.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 6 is a schematic top plan view of the combination of a power operated rotary knife and a blade guide assembly of FIG. 1;

FIG. 7 is a schematic bottom plan view of the combination of a power operated rotary knife and a blade guide assembly of FIG. 1;

DETAILED DESCRIPTION

The present disclosure relates to a blade guide assembly for directing material, such as a conglomeration of small intestine tissue, mesentery tissue and fat tissue removed from an abdominal cavity of a butchered animal, to a rotary knife blade of a power operated rotary knife for the purpose of separating a desired product, such as the small intestine tissue, from the remaining material, such as mesentery tissue and/or fat tissue adhering to an outer surface of the small intestine tissue. The conglomeration of material is directed along a path of travel that is transverse to an axis of rotation of the rotary knife blade and intersects a cutting edge of the rotating rotary knife blade for the purpose of separating the small intestine from the mesentery and/or fat tissue.

Figure 1:
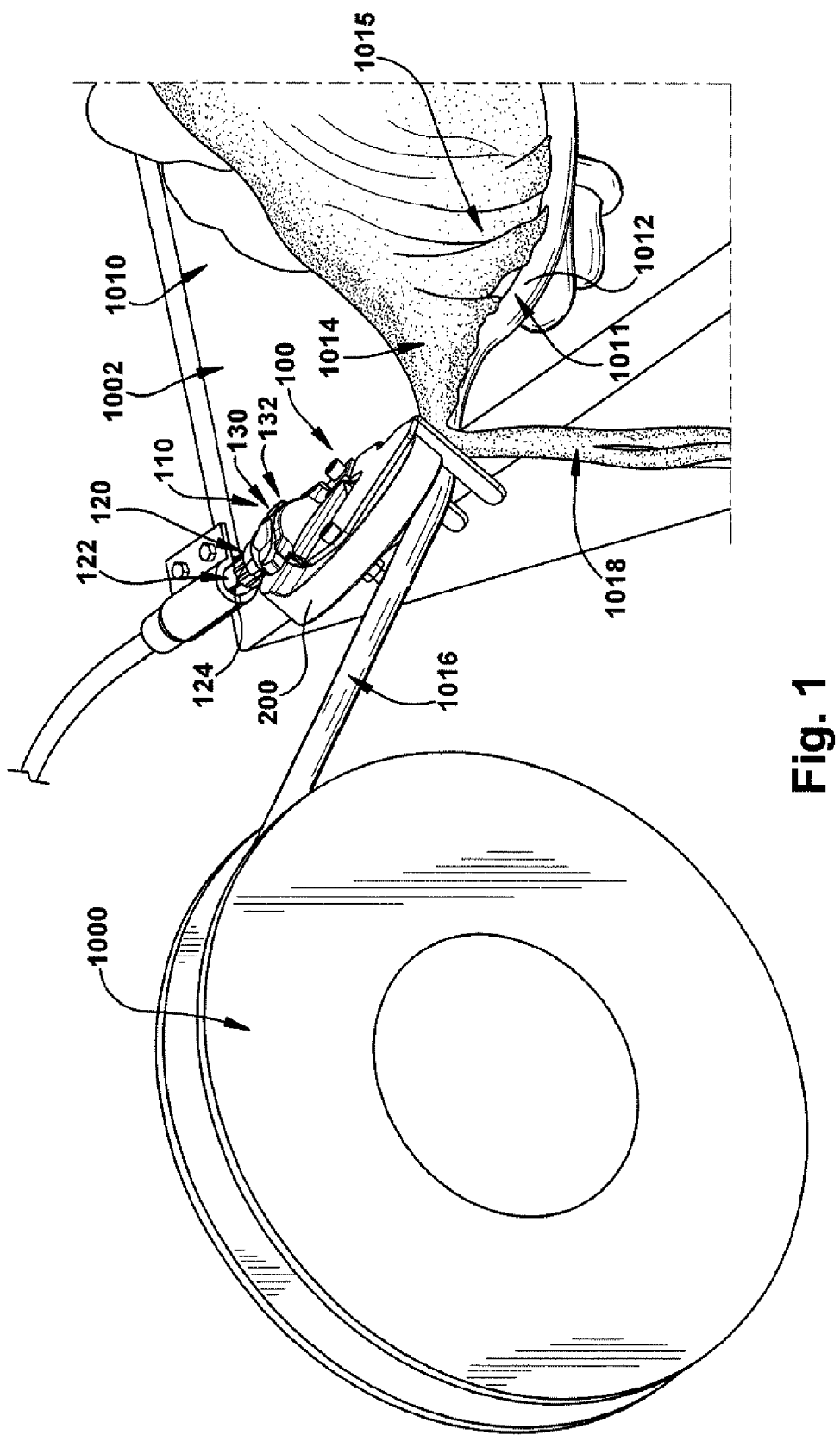
FIG. 1 is a schematic top perspective view of a combination of a power operated rotary knife and a blade guide assembly of the present disclosure as used to separate mesentery and/or fat tissue from an intestine.
Figure 2:
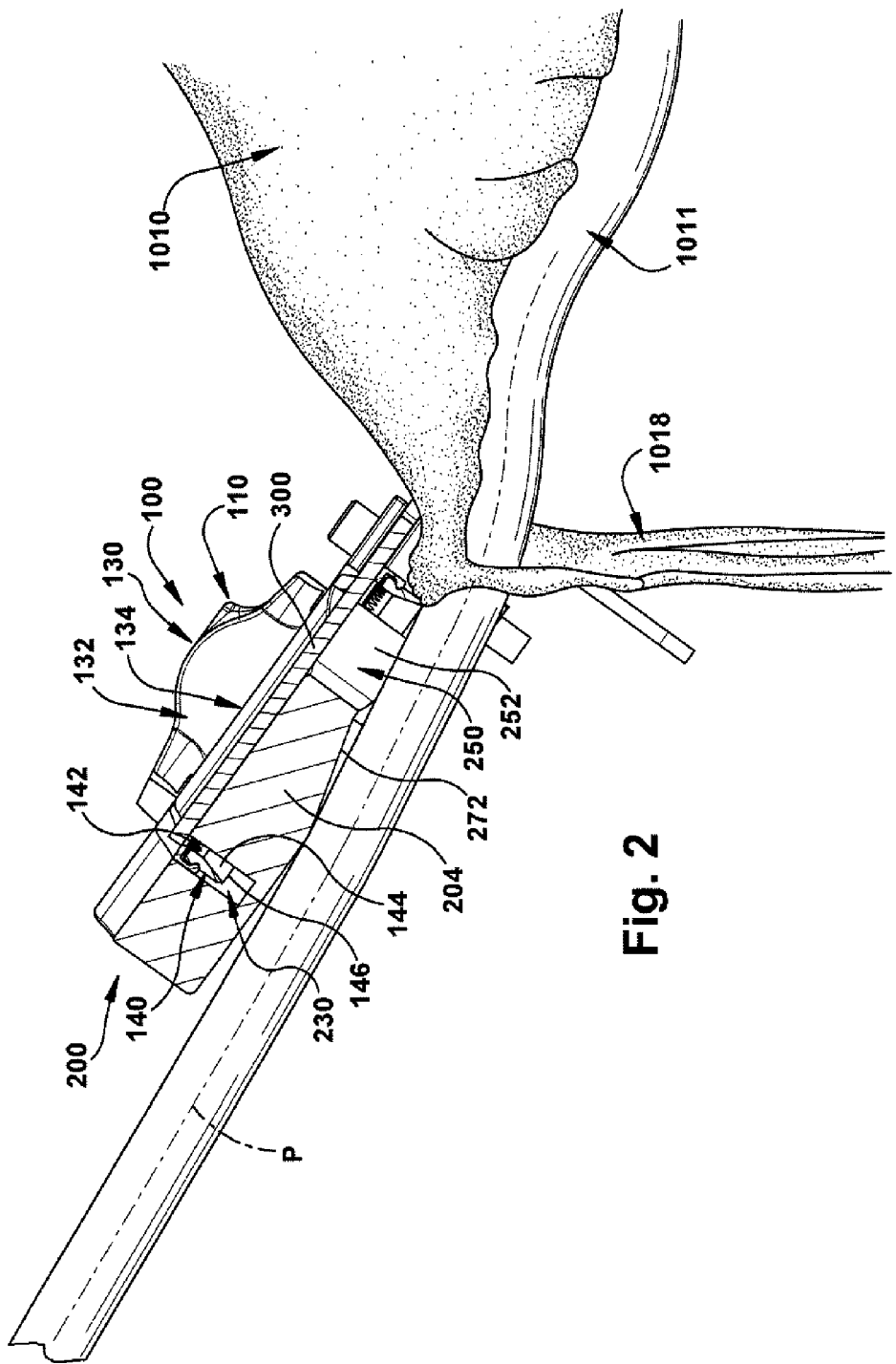
FIG. 2 is a schematic view, partly in perspective and partly in section, of the combination of a power operated rotary knife and a blade guide assembly of FIG. 1 as used to separate mesentery and/or fat tissue from an intestine.
Figure 3:
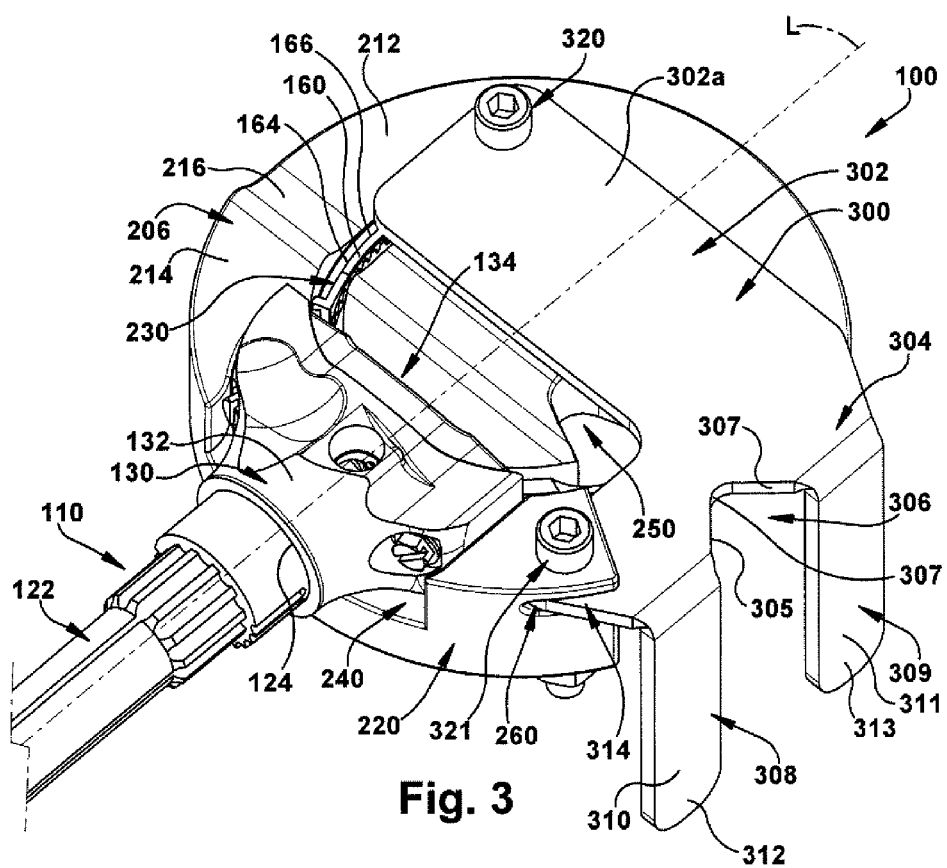
FIG. 3 is a schematic top perspective view of the combination of a power operated rotary knife and a blade guide assembly of FIG. 1.

In one exemplary embodiment, a combination of a power operated rotary knife and a blade guide assembly of the present disclosure is shown generally at 100 in FIGS. 1-9. The combination 100 includes a power operated rotary knife 110 and the blade guide assembly 200. In one exemplary embodiment, as shown in FIGS. 1 and 2, the combination 100 may advantageously mounted or secured to a table or bench 1002 and used in the processing of intestines, more specifically, separating or removing mesentery tissue and/or fat tissue adhering to an outer surface of an intestine. A more detailed discussion regarding a method of processing materials, such as a conglomeration of small intestine tissue, mesentery tissue and/or fat tissue, using the combination 100 is set forth below.

Figure 8:
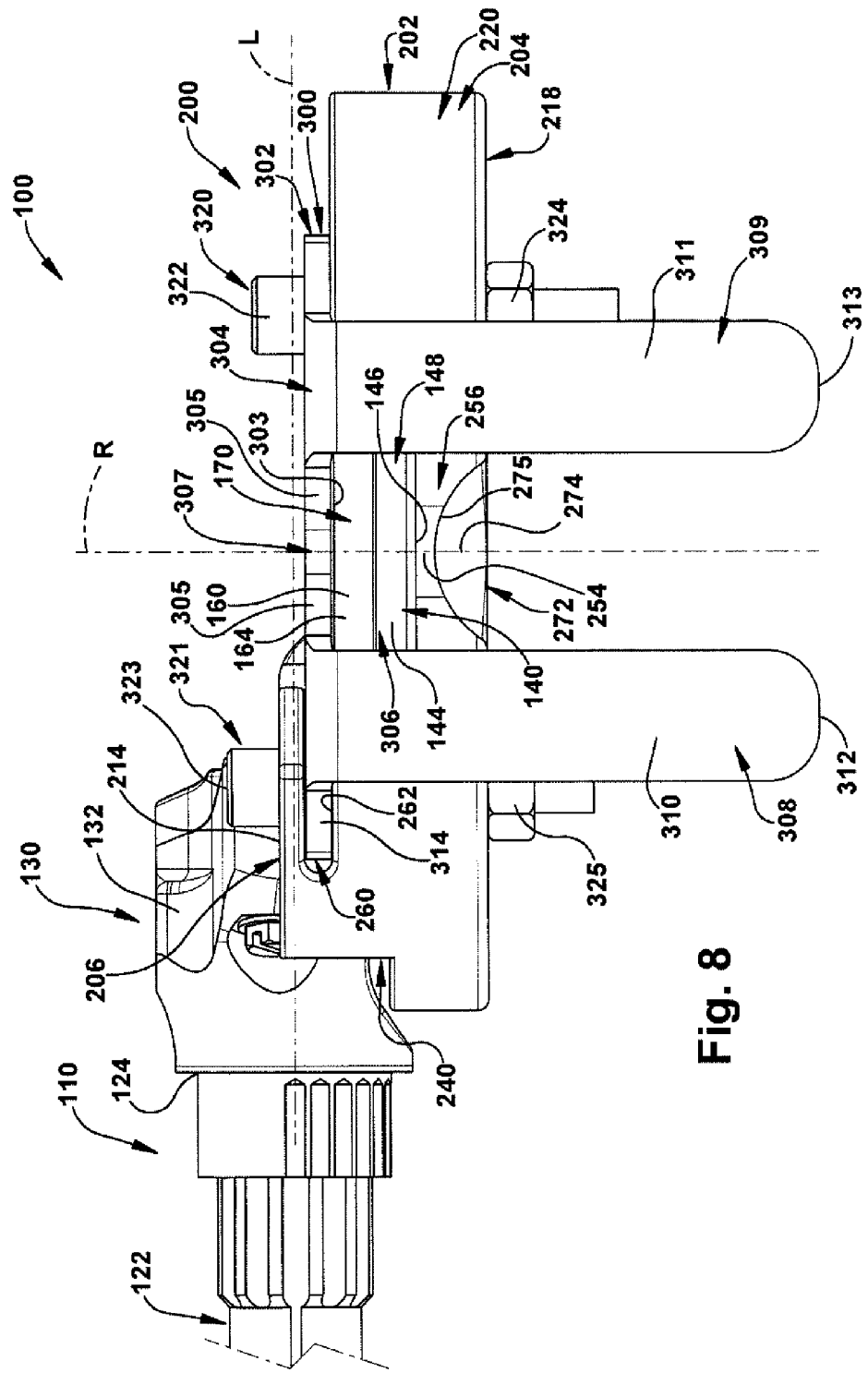
FIG. 8 is a schematic side elevation view of the combination of a power operated rotary knife and a blade guide assembly of FIG. 1.
Figure 9:
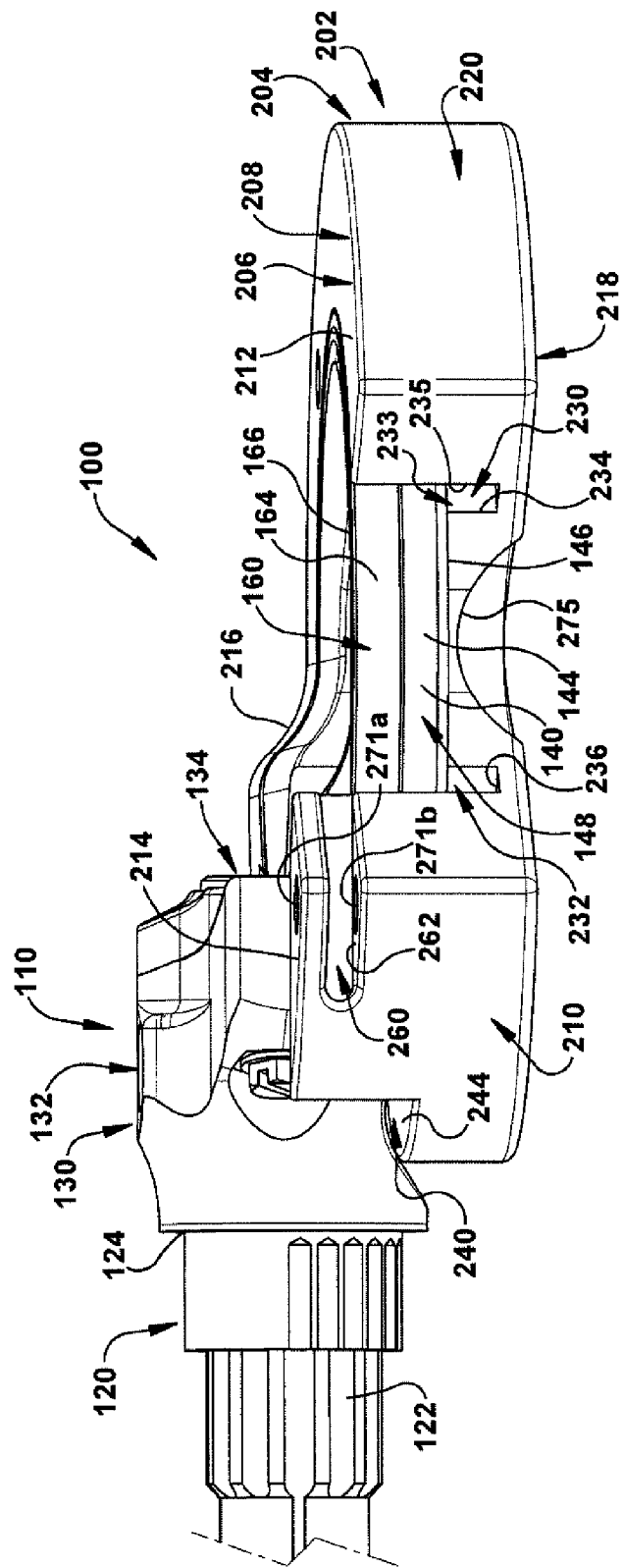
FIG. 9 is a schematic side elevation view of the combination of a power operated rotary knife and a blade guide assembly of FIG. 1 with a cover of the blade guide assembly removed.
Figure 10:
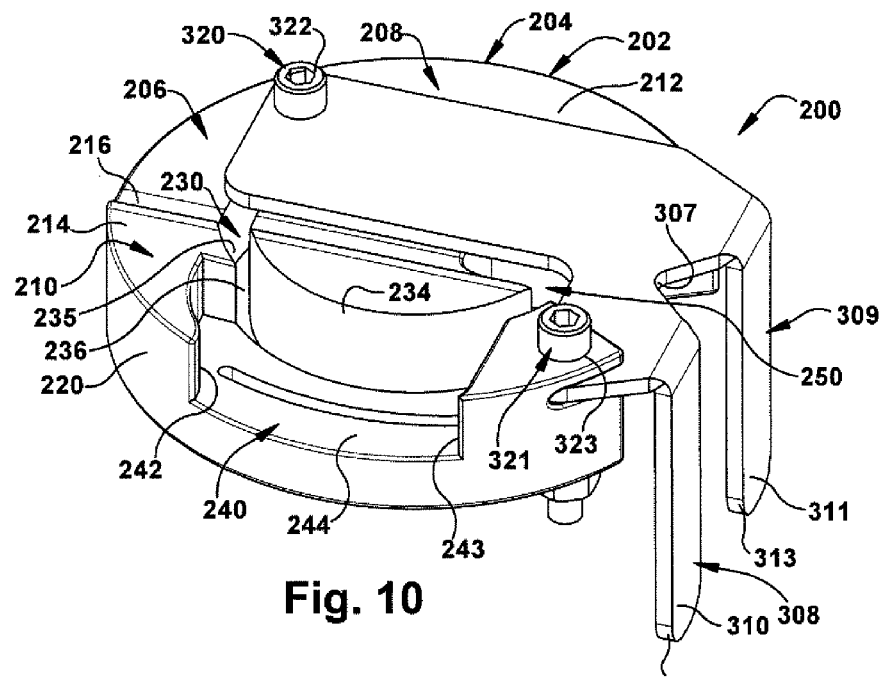
FIG. 10 is a schematic top perspective view of the blade guide assembly of the combination of a power operated rotary knife and a blade guide assembly of FIG. 1.
Figure 11:
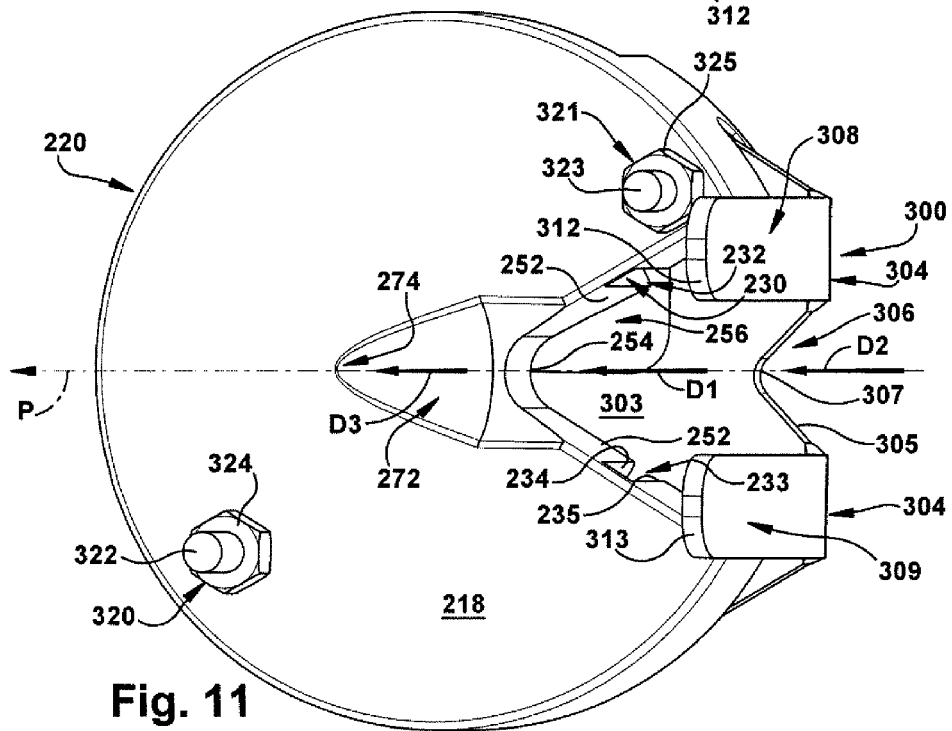
FIG. 11 is a schematic bottom perspective view of the blade guide assembly of the combination of a power operated rotary knife and a blade guide assembly of FIG. 1.
Figure 12:
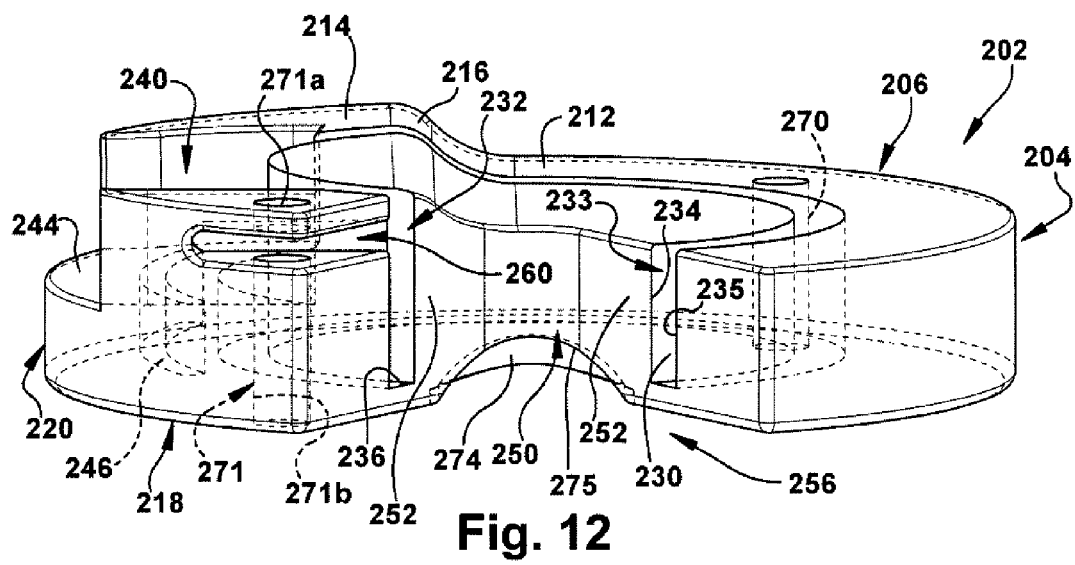
FIG. 12 is a schematic side elevation view of a blade guide of the blade guide assembly of the combination of a power operated rotary knife and a blade guide assembly of FIG. 1.

Specifically, FIGS. 3-9 schematically illustrate one exemplary embodiment of the combination 100 of the power operated rotary knife 100 and the blade guide assembly 200 of the present disclosure. FIGS. 10-12 provide a schematic representation of one exemplary embodiment of the blade guide assembly 200, with the power operated rotary knife 100 removed for ease of viewing.

Power Operated Rotary Knife 110

As can best be seen in FIGS. 3-9, the power operated rotary knife 110 of the combination 100 includes a handle assembly 120 including an elongated frame member 122 and a head assembly 130 extending from a distal end 124 of the frame member. The frame member 122 extends along a longitudinal axis L (FIGS. 3, 6 and 8) and is adapted to receive a hand grip (not shown), which an operator will grip to manipulate the power operated rotary knife 110 for cutting or trimming operations. As noted above, when used for processing certain material, such as intestines, the combination 100 may advantageously secured or mounted to a table or bench 1002. Accordingly, the combination 100 is stationary with respect to a conglomeration of material 1010 (FIG. 1) to be processed, that is, the material 1010 to be processed moves along a path of travel P that intersects the combination 100 and, more, specifically, intersects an exposed section or portion 148 of a rotating rotary knife blade 140 of the power operated rotary knife 110. Thus, in one exemplary embodiment of the combination 100 wherein the combination 100 is used in connection with processing material 1010, such as a conglomeration of material including small intestine tissue 1011 overlied on its outer surface 1012 by mesentery tissue 1014 and/or fat tissue 1015, the combination 100 will advantageously will be mounted to a bench or table 1002. The blade guide 202 or the frame member 122 of the handle assembly 120 of the power operated rotary knife 110 may be use for mounting purposes. The combination 100, therefore, is stationary and the hand grip may be omitted from the frame member 122 of the power operated rotary knife 110.

The head assembly 130 of the power operated rotary knife 110 includes a head member 132. The head member 132 defines a mounting region 134 to which a blade housing 160 of the power operated rotary knife 110 is detachably mounted. The blade housing 160, in turn, rotatably supports the annular rotary knife blade 140 for rotation about an axis of rotation R (FIG. 8). The head member 132 also, in one exemplary embodiment, defines a cavity or opening which receives and supports a gear train (not shown) of the power operated rotary knife 110. The gear train transmits rotational power from a motor to rotate the rotary knife blade 140 at high RPMs (e.g., 1500-2000 RPMs) with respect to the blade housing 160. The motor (not shown) may be external to the handle assembly 120 and supply power via a flexible drive shaft that is coupled to the handle assembly. For example, the motor may be a pneumatic or electric motor and rotational power is transmitted from the motor to the gear train via a flexible drive shaft. Alternatively, the motor may be or internal to the power operated rotary knife 110, for example, a vane-type air or pneumatic motor mounted in the handle assembly which drives the gear train via a planetary gear reduction unit.

The blade housing 160 includes a mounting section 162 for mounting to the mounting region 134 of the head member 132 and an annular blade support section 164, which extends from the mounting section 162. The rotary knife blade 140 includes a body 142 and a blade section 144 extending from the body 142. A distal end of the blade section 144 includes the cutting edge 146 which provides a cutting and scraping action on the outer surface 1012 of the small intestine 1011 as the conglomeration of material 1010, including the small intestine tissue 1011, mesentery tissue 1014 and fat tissue 1015, move along (or are pulled along) the path of travel P.

The size and configuration of the rotary knife blade 140 will depend on the nature of the material 1010 to be processed by the combination 100. Where the material 1010 to be processed is a small intestine 1011 of a larger animal, such as a steer or swine, and the objective of the processing is to separate mesentery tissue 1014 and/or fat tissue 1015 adhering to an outer surface 1012 of the intestine 1011, in one exemplary embodiment, the rotary knife blade 140 is advantageously a straight blade design having an inner diameter of approximately 2.525 inches and an outer diameter of 2.715 inches. However, one of ordinary skill in the art will recognize that other blade sizes and other blade configurations, such as a hook blade design or a flat blade design may be utilized in the power operated rotary knife 110 depending on the nature and characteristics of the material or materials to be processed. Various rotary knife blade designs are disclosed in U.S. patent application Ser. No. 13/189,938, filed Jul. 25, 2011 and entitled POWER OPERATED ROTARY KNIFE. The aforesaid application Ser. No. 13/189,938 is assigned to the assignee of the present application and is incorporated herein in its entirety by reference.

The rotary knife blade body 142 includes a bearing structure adapted to engage a mating bearing structure of the blade housing 160 allowing free rotation of the rotary knife blade 140 within the blade housing 160. Alternatively, an intermediate bearing structure that engages both the rotary knife blade 140 and the blade housing 160 may be used to support the rotary knife blade 140 with respect to the blade housing 160. A combination of the assembled rotary knife blade 140 and the blade housing 160, ready to be mounted to the head member 132 is referred to as the blade-blade housing combination 170. A portion of the blade section 144 of the rotary knife blade 140, including the cutting edge 146, extends below a lower surface of the blade support section 164 of the blade housing 160 in the assembled blade-blade housing combination 170.

Guide Blade Assembly 200

The blade guide assembly 200 of the present disclosure includes a blade guide 202 and a cover 300 which is removably attachable to the blade guide 202 view a plurality of fasteners 320, 321. When the combination 100 is assembled, the cover 300 is attached to the blade guide 202 and the blade-blade housing combination 170 of the power operated rotary knife 110 is secured within an arcuate groove 230 of the blade guide 202, while the head member 132 of the power operated rotary knife 110 is secured within a channel 240 of the blade guide. In this way, assuming the combination 100 of the power operated rotary knife 110 and the blade guide assembly 200 is mounted to a bench or table 1002, the rotary knife blade 140 of the power operated rotary knife is maintained in a stationary position with respect to the bench or table and with respect to a path of travel of material to be processed by the combination. Advantageously, the blade guide 202 includes a notched region 250 which exposes a portion 148 of the rotary knife blade 140 such that the conglomeration of material 1010 to be processed, when traveling along its path of travel P, intersects the rotating rotary knife blade 140, as will be explained below.

As can best be seen in FIG. 12, the blade guide 202 includes a puck-shaped body 204. The blade guide body 204 includes a top wall 206 (FIG. 4), a bottom wall 218 (FIG. 5), axially spaced from the top wall 206, and an outer wall 220 extending between the top and bottom walls 206, 218. A central axis C (FIGS. 8 and 9) of the blade guide assembly 200 extends through the blade guide body 204 in an axial direction and is substantially congruent with the axis of rotation R of the rotary knife blade 140.

The bottom wall 218 of the blade guide body 204 is generally planar. However, as best seen in FIGS. 9 and 10, blade guide body 204 includes an axially thinner region 208 and an axially thicker region 210. This results in the top wall 206 of the blade guide body 204 having two planar surfaces 212, 214 with different relative axial heights. The axially thinner region 208 of the blade guide body 204 corresponds to the planar region 212 and the axially thicker region 210 corresponds to the planar region 214. A transition region 216 of the top wall 206 bridges the axially thinner region 208 and the axially thicker region 210.

As best seen in FIGS. 4, 5, 9 and 12, the arcuate groove 230 is radially inwardly spaced from the outer wall 220 and terminates at ends 232, 233 which intersect the notched region 250. The arcuate groove 230 is defined by parallel, radially spaced apart side walls 234, 235 and a lower wall 236. The arcuate groove 230 is sized to receive the blade-blade housing combination 170 such that, when assembled, the cover 300 of the blade guide assembly 200 bears against an upper surface 166 of the blade support section 164 of the blade housing 160 to: 1) tightly secure the blade-blade housing 170 with respect to the blade guide 202 thereby reducing or eliminating any undesirable relative movement of the blade-blade housing combination 170 within the arcuate groove 230; and 2) accurately position the rotary knife blade 140 with respect to the top and bottom walls 206, 218 of the blade guide 202. In one exemplary embodiment, the arcuate groove 230 has an axial depth of approximately 0.625 inch when measured from the planar surface 212 of the blade guide top wall 206 in the axially thinner region 208. The size and depth of the arcuate groove 230 with respect to the blade-blade housing combination 170 is important because the cutting edge 146 of the rotary knife blade 140 is spaced axially and radially from the blade guide 202 and should not contact any portion of the blade guide 202 when the combination 100 is assembled or operated.

The blade guide body 204 also includes a channel 240 (FIG. 4) which extends from the outer wall 220 and intersects the arcuate groove 230. The channel 240 includes side walls 242, 243 and a horizontally extending lower wall 244. The channel 240 is configured to receive the head member 132 of the handle assembly 120 of the power operated rotary knife 110. The head member 132 rests in the channel 240. As can be seen, the channel 240 extends through the axially thicker region 210 of the blade guide body 204. As can best be seen in FIG. 10, in the axially thicker region 210 of the blade guide body 204, the arcuate groove 230 has a greater axial depth (i.e., a greater depth than 0.625 in.) than the axial depth of the arcuate groove 230 in the axially thinner region 208. The thicker region 210 allows the side walls 242, 243 of the channel 240 to advantageously be higher and thereby better secure the handle assembly 120 of the power operated rotary knife 110. When the cover 300 is affixed to the blade guide body 204, the head member 132 of the power operated rotary knife 110 bears against the lower wall 244 of the channel 240 and the upper wall 166 of the blade support section 164 of the blade housing 160 to securely and accurately position the rotary knife blade 140 within the arcuate groove 230 of the blade guide assembly 200. The blade guide assembly 200 is designed to be sturdy such that the blade guide body 204 may be fixed to a bench or table 1002 (FIG. 1), while the blade-blade housing combination 170 is securely and accurately positioned with respect to the path of travel P of the material 1010 to be processed. The lower wall 244 of the channel 240 includes an axial extending vertical slot 246. The vertical slot 246 is sized to snugly receive a downwardly extending finger guard 136 of the head member 132 of the power operated rotary knife 110.

As mentioned previously, the notched region 250 intersects the peripherally spaced apart ends 232, 233 of the arcuate groove 230, but unlike the groove 230, which does not extending axially to the bottom wall 218, the notched region 250 extends axially from the top wall 206 to the bottom wall 218. The notched region 250 is defined by planar side walls 252 which terminate at a vertex 254. The notched region 250 defines a pie-shaped opening 256 terminating at the vertex 254. In one exemplary embodiment, the notched region 254 defines an angle of approximately 60 degrees and extends radially inwardly from the blade guide outer wall 220 to the vertex 254, the vertex 254 being approximately 0.325 in. from the central axis C of the blade guide assembly 200. That is, the central axis C extends substantially through a geometric center of the blade guide body 204 and the notched region 250 does not extend to the geometric center of the body 204. The notched region 250 is characterized by a direction D1 (FIGS. 7 and 11) which is aligned with the path of travel P of the conglomeration of material 1010. The direction D1 can be thought as extending from a midpoint (labeled as MP1 in FIG. 7) of an imaginary section of the outer wall 220, if the outer wall 220 extended through the notched region 250 to form a complete circle, toward the vertex 254 formed by the side walls 252.

Figure 4:
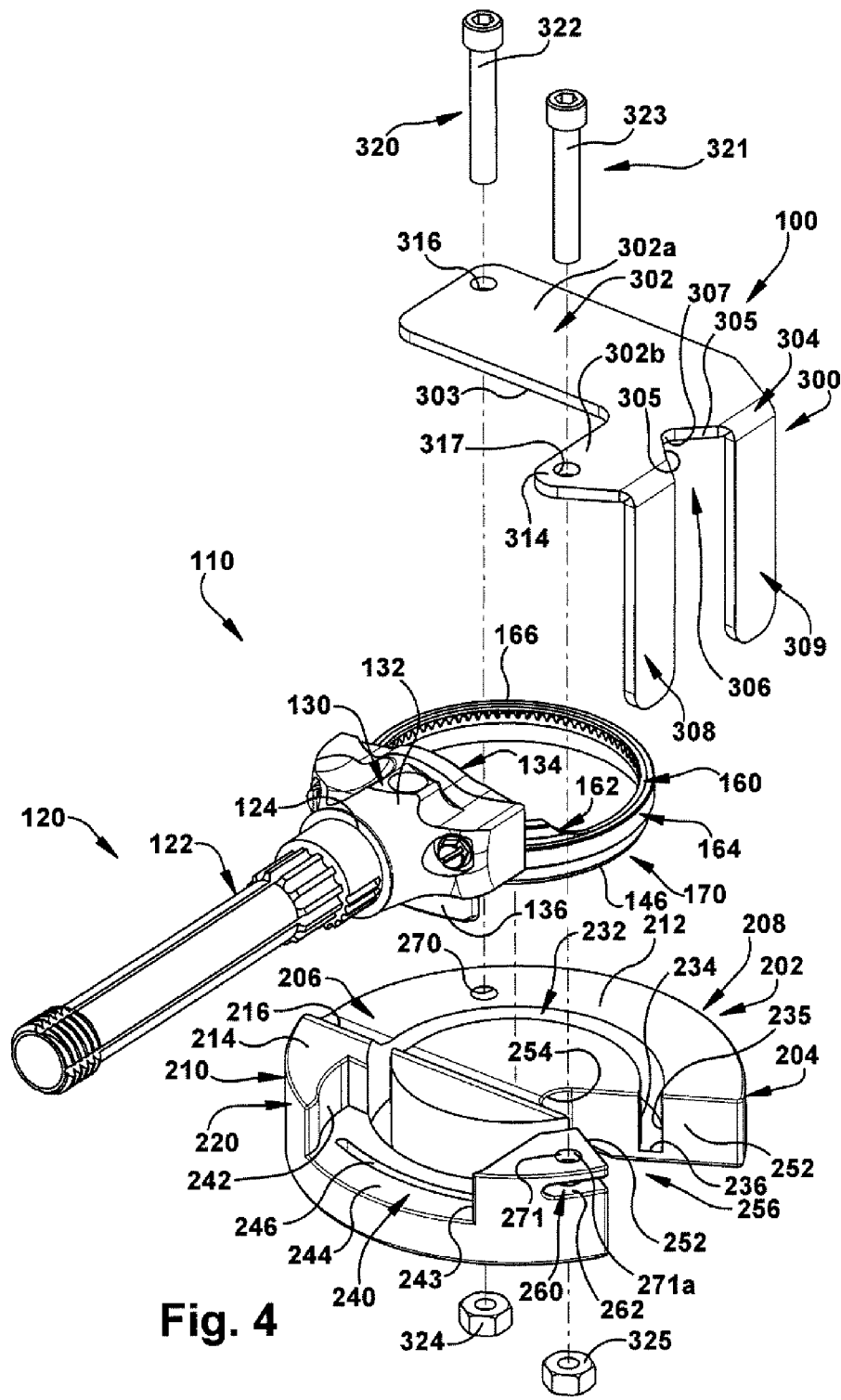
FIG. 4 is a schematic exploded top perspective view of the combination of a power operated rotary knife and a blade guide assembly of FIG. 1.
Figure 5:
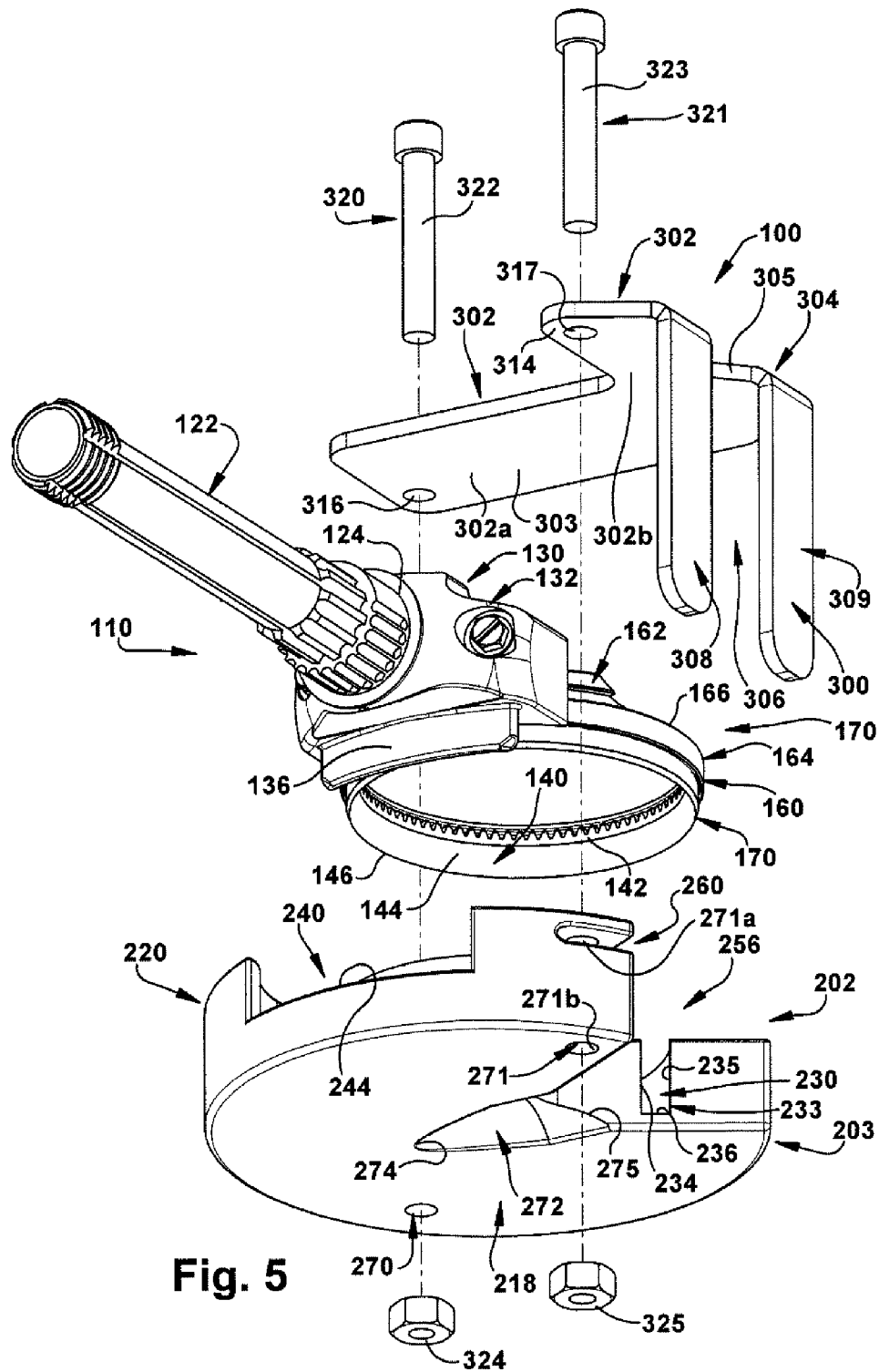
FIG. 5 is a schematic exploded bottom perspective view of the combination of a power operated rotary knife and a blade guide assembly of FIG. 1.

As can be seen in FIGS. 4 and 5, in the axially thicker region 210 of the blade guide body 204, a horizontally extending slot 260 is formed extending radially inwardly from the outer wall 220 and peripherally from the side wall 252 of the notched region 250. As can best be seen in FIG. 10, the slot 260 receives a triangular projection 314 of the cover 300. Since, as will be described below, the base 302 of the cover 300 is planar, a lower wall 262 of the slot 260 is substantially co-planar with the planar surface 212 of the axially thinner region 208 of the blade guide 200 such that a lower planar surface 303 of the base 302 mounts flush and flat on the planar surface 212 of the thinner region 208 and the lower wall 262 of the slot 260 of the thicker region 210 of the blade guide 202. A first opening 270 extends axially through the thinner region 208 of the blade guide body 204, while a second opening 271 extends axially through the thicker region 210 of the blade guide body 204. As can best be seen in FIG. 5, an upper portion 271a of the second opening 271 extends though a portion of the blade guide body 204 above the horizontally extending slot 260, while a lower portion 271b of the second opening 271 extends through a portion of the blade guide body 204 below the horizontally extending slot 260.

As best seen in FIGS. 4, 5 and 10, the cover 300 of the blade guide assembly 200, as noted above, includes the generally planar L-shaped base 302 and an outer extension 304 which extends radially outwardly from the base 302. As can best be seen in FIG. 10, the base 302 includes a generally rectangular portion 302a and an extending portion 302b from the rectangular portion 302. The extending portion 302b is disposed radially outwardly of the rectangular portion 302a. The rectangular portion 302a of the base 302 includes a first aperture 316 and the extending portion 302b of the base 302 includes a second aperture 317. A pair of fasteners 320, 321 extends through the apertures 316, 317 and the aligned openings 270, 271 of the blade guide body 204 to secure the cover 300 to the blade guide body 204. In one exemplary embodiment, the pair of fasteners 320, 321 comprise threaded bolts 322, 323 and mating nuts 324, 325 which thread onto the threaded bolts 322, 323. The nuts 324, 325 bear against the bottom wall 218 of the blade guide body 204, while heads of the threaded bolts 322, 323 bear against the top wall 206 to secure the cover 300 to the blade guide 202.

Extending radially outwardly from the extending portion 302b of the base 302 is the outer extension 304 of the cover 300. The outer extension 304 includes an upper section 304a and a pair of parallel guard fingers 308, 309 that extend orthogonally from the upper section 304a. The upper section 304a and the guide fingers 308, 309 together define an opening 306. The opening 306 includes a vertex 307 defined by V-shaped side walls 305 of the upper section 304a. The conglomeration of material 1010 to be processed, moving along its path of travel P, is routed to pass through the opening 306. As will be explained below, as the conglomeration of material 1010 passes through the opening 306, advantageously, partial processing of the conglomeration of material 1010 occurs. That is, as the material 1010 passes through the opening 306, the outer surface 1012 of the small intestine 1011 is scraped by the side walls 305 of the upper section 304a and the guide fingers 308, 309 to remove a portion of the mesentery and/or fat tissue 1014, 1015 from the outer surface 1012 of the small intestine 1011.

The opening 306, as defined by the V-shaped side walls 305, is characterized by a direction D2 (FIGS. 7 and 11) which is aligned with the direction D1 of the notched region, that is, the direction D2 is aligned with the vertex 254 of the notched region 250. The direction D2 can be thought of as extending from a midpoint (labeled as MP2 in FIG. 7) of a line connecting the side walls 305 toward the vertex 307 of the opening 306. Thus, the opening 306 of the cover 300 is radially aligned with the notched region 250 of the blade guide body 204 and the vertex 307 of the opening 306 of the cover 300 is radially aligned with the vertex 254 of the notched region 250 of the blade guide body 204. The direction D2 is also aligned with the path of travel P of the conglomeration of material 1010.

The guard fingers 308, 309 are radially spaced from the outer wall 220 of the blade guide body 204 and are generally parallel to the central axis C of the blade guide assembly 200. The guard fingers 308, 309 include portions 310, 311 that extend axially below the bottom wall 218 of the blade guide body 204. The portions 310, 311 of the guard fingers 308, 309 include tapered ends 312, 313. Thus, the guard fingers 308, 309 function to define a portion of the opening 306, allow easy insertion of the material 1010 into the opening 306, scrape and thereby partially process the material 1010, and additionally are a safety feature to keep an operator's hands away from the exposed portion 148 of the rotary knife blade 140. (The operator may be guiding the material 1010 as it is pulled by the spinning wheel 1000.)

In order to help guide the cleaned intestine 1016 along its path of travel P after the material 1010 has intersected the exposed portion 148 of the rotary knife blade 140, the bottom wall 218 of the blade guide body 204 includes a bullet-shaped recess 272 (best seen in FIG. 7) that extends from the side walls 252 and a peripheral portion 275 of the bottom wall 218 defining the notched region 250 and converges to a vertex 274. The recess 272 is characterized by a direction D3 (FIGS. 7 and 11) which is aligned with both the direction D1 of the notched region and the direction D2 of the opening 306 of the cover 300. That is, the direction D3 is aligned with the vertex 254 of the notched region 250 of the blade guide body 204 and the vertex 307 of the opening 306 of the cover 300. The direction D3 can be thought of as extending from a midpoint (labeled as MP3 in FIG. 7) of a line connecting the side walls of the recess 272 toward the vertex 274 of the recess 272. Thus, the recess 272 of the bottom wall 218 of the blade guide body 204 is radially aligned with the opening 306 of the cover 300 and is radially aligned with the notched region 250 of the blade guide body 204. The vertex 274 of the recess 272 is radially aligned with the vertex 307 of the opening 306 of the cover 300 and is radially aligned with the vertex 254 of the notched region 250 of the blade guide body 204.

Method of Separating Intestine Tissue from Mesentery Tissue

In order to process an intestine, such as a small intestine, for human or animal consumption, one step that is undertaken is the separation of mesentery and fat tissue adhering to an outer surface of the intestine from the intestine. Intestinal tissue is supported in the abdominal cavity of an animal by mesentery tissue. Further, fat tissue present in the abdominal cavity may intertwine around the intestine and/or the mesentery tissue. Thus, when an animal is slaughtered and the intestine is removed from the abdominal cavity, portions of the outer surface of the intestine are overlied and entwined by mesentery tissue and/or fat tissue. The mesentery and fat tissue may attach and adhere to the outer surface of the intestine. When processing an intestine, it is desired to remove as much of the mesentery and fat tissue from the outer surface prior to further processing of the intestine.

Turning to the drawings, the conglomeration of intestine, mesentery tissue and fat tissue intertwined with the intestine is schematically shown in FIG. 1 at 1010. In the processing of the intestine 1011, which is generally cylindrical in configuration, an end of the unprocessed intestine 1011 is attached to a spinning wheel 1000, as the wheel is rotated; the intestine 1011 is pulled from the conglomeration 1010. Pieces of mesentery tissue 1014 and/or fat tissue 1015 clinging or adhering to the outer surface 1012 of the intestine 1011 move with the intestine 1011 as the intestine 1011 is pulled from the conglomeration 1010.

The combination 100 of the power operated rotary knife 110 and the blade guide assembly 200 are positioned along the path of travel P of the intestine 1011 such that the intestine 1011 intersects the combination 100. The combination 100 may advantageously be mounted to a bench or table 1002 thereby avoiding the need for an operator to move or manipulate the combination 100 during the processing operation. Instead, the power operated rotary knife 110 is actuated to rotate the rotary knife blade 140. The intestine 1011 is directed by the blade guide assembly 200 to intersect the rapidly rotating knife blade 140 of the power operated rotary knife 110.

Separation of the mesentery tissue 1014 and fat tissue 1015 advantageously results from at least three separating actions that occur as the intestine 1011 moves along its path of travel P and intersects and passes through the combination 100, as shown in FIGS. 1 and 2. First, as the intestine 1011 moves in the direction or path of travel P, the intestine 1011 intersects the blade guide assembly 200 and, specifically, intestine 1011, with adhering mesentery tissue 1014 and fat tissue 1015, passes through the opening 306 of the cover outer extension 304 defined by the side walls 305 and the guard fingers 308, 309. The side walls 305 and the guard fingers 308, 309 function to scrape against the outer surface 1012 of the generally cylindrical intestine 1011 to remove a portion of the mesentery tissue 1014 and the fat tissue 1015 adhering to the outer surface 1012 of the intestine 1011. The intestine 1011 is a strong tissue, both axially and radially. The mesentery tissue 1014 and fat tissue 1015 adhering to the intestine 1011 generally have an attachment bond or strength that is significantly less than the axial and radial strength of the intestine 1011. Thus, the scraping action of the cover 300 effectively removes portions of the adhering mesentery and fat tissue 1014, 1015 without ripping or tearing of the intestine 1011.

Second, as the intestine 1011 continues along the path of travel P, the intestine 1011 intersects the exposed portion 148 of the rotary knife blade 140 disposed in a notched region 250 of a blade guide 202. The rapidly rotating rotary knife blade 140 provides both a cutting action to cut the mesentery and fat tissue 1014, 1015 adhering to the intestine 1011 and a scraping action to remove additional mesentery tissue 1014 and fat tissue 1015 from the outer surface 1012 of the intestine 1011. Again, because of the strength of the intestine 1011, the intestine 1011 is not significantly damaged as it passes over the cutting edge 146 of the rotary knife blade 140. Additionally, as can best be seen in FIG. 8, since the level of the bottom wall 218 of the blade guide 202 is offset axially from the cutting edge 146 of the rotary knife blade 140, the intestine 1011 is lifted axially away from blade 140 by the blade guide bottom wall 218. Advantageously, because of the foregoing configuration, the pressure or force of contact between the blade cutting edge 146 and the outer surface 1012 of the intestine 1011 is limited. This mitigates the probability that the rotary knife blade 140 will cut deeply into the outer surface 1012 of the intestine 1011 as the intestine 1011 passes over the blade cutting edge 146. Instead, the rotating blade 140 effectively performs a desired separation action by cut and scraping the mesentery and fat tissue 1014, 1015 adhering to the outer surface 1012 of the intestine 1011.

Third, as the intestine 1011 continues along the path of travel P, the intestine 1011 intersects the bullet shaped recess 272 in the bottom wall 218. Because bullet shape of the recess 272 and the position of the recess 272 along the intestine path of travel P, the intestine 1011 rides along the recess. The peripheral portion 275 of the bottom wall 218 defining the entry to the recess 272 functions to scrape against the outer surface 1012 of the intestine 1011 to further remove mesentery tissue 1014 and fat tissue 1015 adhering to the outer surface 1012 of the intestine 1011. Thus, the combination 100 advantageously includes three actions or steps to remove the mesentery tissue 1014 and the fat tissue 1015 from the outer surface 1012 of the intestine 1011 as the intestine 1011 is pulled along its path of travel. P, without intervention by a human operator and without significant damage to the intestine 1011.

As used herein, terms of orientation such as upper, lower, inward, outward, etc., are provided for convenience purposes and relate generally to the orientation shown in the Figures. Such orientation terms are not intended to limit the scope of the present disclosure or the claims appended hereto.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A blade guide assembly for guiding material to intersect a rotary knife blade of a power operated rotary knife, the blade guide assembly comprising:
   a blade guide and a cover secured to the blade guide;
   the blade guide includes a top wall, a bottom wall spaced axially from the top wall and an outer wall, an arcuate blade-receiving groove spaced radially inwardly from the outer wall, extending axially from the top wall and defining peripherally spaced apart ends, a head member-receiving channel extending radially inwardly from the outer wall and intersecting the arcuate blade-receiving groove, and a notched region intersecting the peripherally spaced apart ends of the arcuate blade-receiving groove and extending from the top wall through the bottom wall, the notched region defining an opening extending radially inwardly from the outer wall; and
   the cover includes a base secured to the top wall of the blade guide and overlying at least a portion of the arcuate blade-receiving groove.

2. The blade guide assembly of claim 1 wherein the cover further includes an outer extension defining an opening aligned with the opening of the blade guide notched region.

3. The blade guide assembly of claim 1 wherein the blade guide is puck-shaped, the outer wall being substantially cylindrical.

4. The blade guide assembly of claim 1 wherein the notched region of the blade guide is peripherally spaced from the head member-receiving channel.

5. The blade guide assembly of claim 1 wherein the cover is secured to the blade guide by first and second fasteners, the first fastener extending through a first aperture in the cover and into a first opening defined in the top wall of the blade guide and the second fastener extending through a second aperture in the cover and into a second opening defined in the top wall of the blade guide.

6. The blade guide assembly of claim 5 the top wall includes a planar surface region and a raised portion adjacent the head member-receiving channel.

7. The blade guide assembly of claim 6 wherein the raised portion of the top wall includes a slot extending radially inwardly from the outer wall between the head member-receiving channel and the notched region, the slot being substantially co-planar with the planar surface region of the top wall and receiving a portion of the cover.

8. The blade guide assembly of claim 7 wherein the second opening in the top wall is in the raised portion and the second fastener extends through the slot.

9. The blade guide assembly of claim 1 wherein the base of the cover is substantially planar.

10. The blade guide assembly of claim 2 wherein the outer extension of the cover extends radially beyond the blade guide outer wall.

11. The blade guide assembly of claim 10 wherein the outer extension of the cover includes a pair of peripherally spaced apart projecting guards at opposite peripheral ends of the opening, the pair of guards extending transversely to the base of the cover along the outer wall of the blade guide.

12. The blade guide assembly of claim 2 wherein the opening of the outer extension of the cover is substantially v-shaped, the v-shaped opening extending radially inwardly from the opposite peripheral ends of the opening to form a vertex, the vertex being aligned with the opening of the notched region of the blade guide.

13. The blade guide assembly of claim 1 wherein the opening of the notched region of the blade guide is substantially v-shaped, the opening extending between side walls of the notched region and forming a vertex and further wherein the bottom wall of the blade guide is substantially planar and includes a recess adjacent the vertex of the opening of the notched region.

14. A combination of a power operated rotary knife and a blade guide assembly for guiding material to intersect a rotary knife blade of the power operated rotary knife, the combination comprising:
   the power operated rotary knife comprising: a handle assembly including an elongated frame member and a head member extending from an end of the elongated frame member, the head member including a mounting region;
   the rotary knife blade; and
   a blade housing rotatably supporting the rotary knife blade, a portion of the rotary knife blade extending from the blade housing, the blade housing mounted to the mounting region of the head member; and
   the blade guide assembly comprising a blade guide and a cover, the blade guide includes a top wall, a bottom wall spaced axially from the top wall and an outer wall, an arcuate groove spaced radially inwardly from the outer wall, extending axially from the top wall and defining peripherally spaced apart ends, the arcuate groove receiving the rotary knife blade of the power operated rotary knife, a channel extending radially inwardly from the outer wall and intersecting the arcuate groove, the channel receiving the head member, and a notched region intersecting the peripherally spaced apart ends of the arcuate blade-receiving groove and extending from the top wall through the bottom wall, the notched region defining an opening extending radially inwardly from the outer wall, a portion of the rotary knife blade traversing the opening defined by the notched region; and
   the cover includes a base secured to the top wall of the blade guide and overlying at least a portion of the arcuate groove to secure the blade housing of the power operated rotary knife within the arcuate groove.

15. The combination of claim 14 wherein the cover further includes an outer extension defining an opening axially aligned with the notched region of the blade guide to guide material to intersect the portion of the rotary knife blade traversing the opening defined by the notched region.

16. The combination of claim 14 wherein the blade guide is puck-shaped, the outer wall, being substantially cylindrical.

17. The combination of claim 14 wherein the notched region of the blade guide is peripherally spaced from the channel.

18. The combination of claim 14 wherein the cover is secured to the blade guide by first and second fasteners, the first fastener extending through a first aperture in the cover and into a first opening defined in the top wall of the blade guide and the second fastener extending through a second aperture in the cover and into a second opening defined in the top wall of the blade guide.

19. The combination of claim 18 the top wall includes a planar surface region and a raised portion adjacent the channel.

20. The combination of claim 19 wherein the raised portion of the top wall includes a slot extending radially inwardly from the outer wall between the channel and the notched region, the slot being substantially co-planar with the planar surface region of the top wall and receiving a portion of the cover.

21. The combination of claim 20 wherein the second opening in the top wall is in the raised portion and the second fastener extends through the slot.

22. The combination of claim 14 wherein the base of the cover is substantially planar.

23. The combination of claim 15 wherein the outer extension of the cover extends radially beyond the blade guide outer wall.

24. The combination of claim 23 wherein the outer extension of the cover includes a pair of peripherally spaced apart projecting guards at opposite peripheral ends of the opening, the pair of guards extending transversely to the base of the cover along the outer wall of the blade guide.

25. The combination of claim 15 wherein the opening of the outer extension of the cover is substantially v-shaped, the v-shaped opening extending radially inwardly from the opposite peripheral ends of the opening to form a vertex, the vertex being aligned with the opening defined by the notched region of the blade guide.

26. The combination of claim 25 wherein the opening of the notched region of the blade guide is substantially v-shaped, the v-shaped opening extending between side walls of the notched region and forming a vertex and further wherein the bottom wall of the blade guide is substantially planar and includes a recess adjacent the vertex of the opening of the notched region.

* * * * *